United States Patent [19]

Neumann

[11] Patent Number: 5,256,128
[45] Date of Patent: Oct. 26, 1993

[54] GRIPPER EXCHANGE MECHANISM FOR SMALL ROBOTS

[75] Inventor: Hans D. Neumann, Los Altos, Calif.

[73] Assignee: Hewlett-Packard Company, Palo Alto, Calif.

[21] Appl. No.: 871,582

[22] Filed: Apr. 20, 1992

Related U.S. Application Data

[63] Continuation of Ser. No. 466,523, Jan. 17, 1990, abandoned.

[51] Int. Cl.$^5$ ............................................. B23Q 3/155
[52] U.S. Cl. .................................. 483/1; 294/86.4; 414/729; 483/59; 483/901; 901/41
[58] Field of Search .................. 414/729; 294/86.4; 901/28, 29, 41; 483/902, 901, 1, 59, 69

[56] References Cited

U.S. PATENT DOCUMENTS

| | | | |
|---|---|---|---|
| Re. 32,854 | 2/1989 | McCormick et al. | 901/29 X |
| 4,486,928 | 12/1984 | Tucker et al. | 483/901 X |
| 4,512,709 | 4/1985 | Hennekes | 414/729 |
| 4,549,846 | 10/1985 | Torii et al. | 414/729 |
| 4,604,024 | 8/1986 | Edwards et al. | 414/592 |
| 4,613,277 | 9/1986 | Guay et al. | 414/729 |
| 4,621,854 | 11/1986 | Boley et al. | 294/88 |
| 4,636,135 | 1/1987 | Bancon | 29/568 X |
| 4,652,203 | 3/1987 | Nakashima et al. | 294/86.4 X |
| 4,660,274 | 4/1987 | Goumas et al. | 29/568 |
| 4,664,588 | 5/1987 | Newell et al. | 901/29 X |
| 4,707,013 | 11/1987 | Vranish et al. | 294/119.1 |
| 4,710,093 | 12/1987 | Zimmer et al. | 414/730 |
| 4,715,636 | 12/1987 | Wiesner et al. | 294/86.4 |
| 4,735,451 | 4/1988 | Wojciechowski et al. | 294/103.1 |
| 4,809,425 | 3/1989 | Monforte | 483/1 |
| 4,815,780 | 3/1989 | Obrist | 294/86.4 |
| 4,913,617 | 4/1990 | Nicholson | 294/86.4 X |

FOREIGN PATENT DOCUMENTS

| | | | |
|---|---|---|---|
| 274332 | 7/1988 | European Pat. Off. | 901/41 |
| 2192855 | 1/1988 | United Kingdom | 901/41 |

OTHER PUBLICATIONS

A. W. Cummins et al., Removable Robotic Devices, IBM Technical Disclosure Bulletin, vol. 24 No. 7A, Dec. 1981.

Primary Examiner—Z. R. Bilinsky
Attorney, Agent, or Firm—Richard F. Schuette

[57] ABSTRACT

Methods and apparatus for exchanging the end effectors of apparatus for handling objects, such as robotic manipulators are disclosed. A compliant tool depository is used in conjunction with a tool holder to perform the end effector exchange. The present invention utilizes the motive force provided by the end effector actuation to execute the sequence required for end effector exchange. A bi-stable latch is provided which minimizes the force required to latch and unlatch the end effectors, thereby providing an end effector exchange mechanism useful in small laboratory robots possessing small operating forces. The tool depository design also adds to the positional forgiveness of the apparatus, allowing the robotic arm and the depository to be aligned with a lesser degree of precision than might otherwise be required.

20 Claims, 6 Drawing Sheets

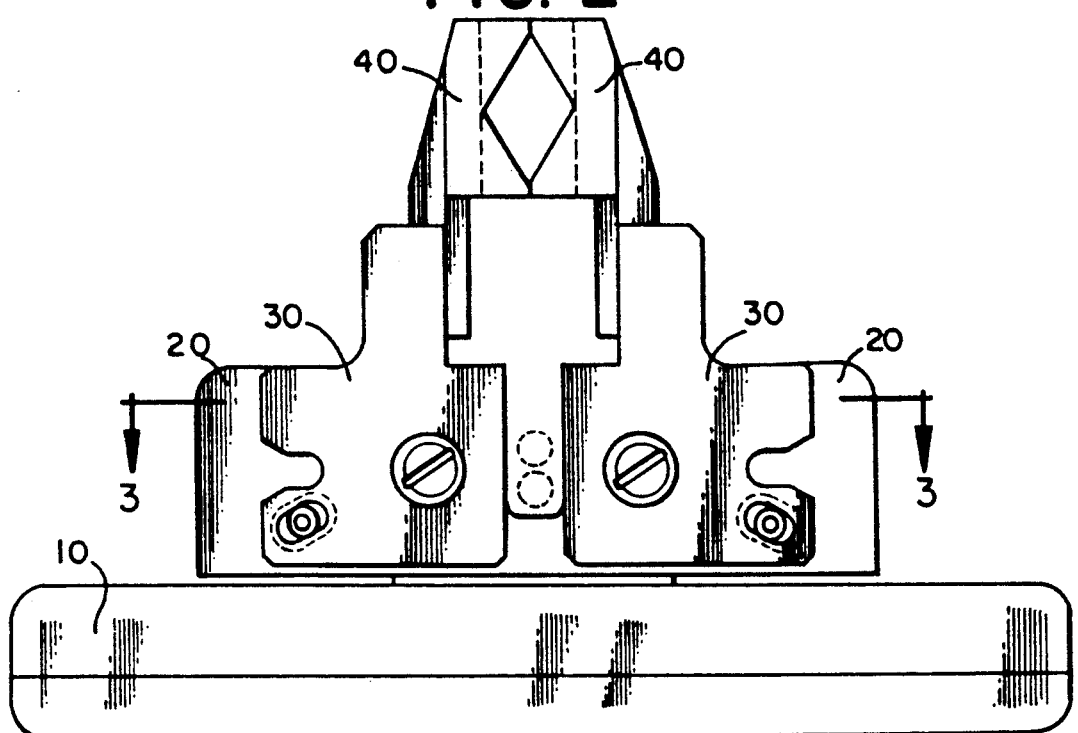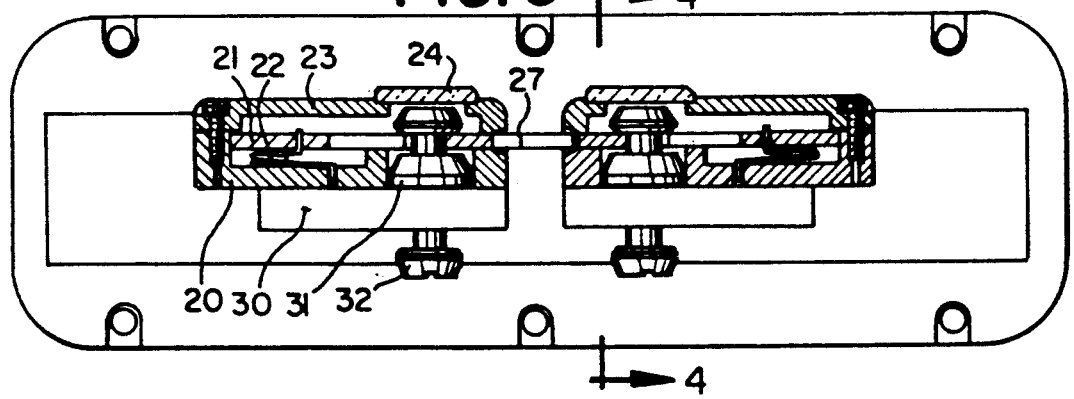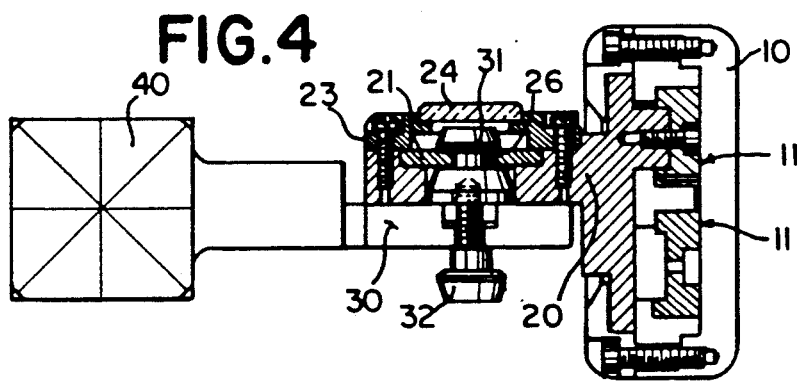

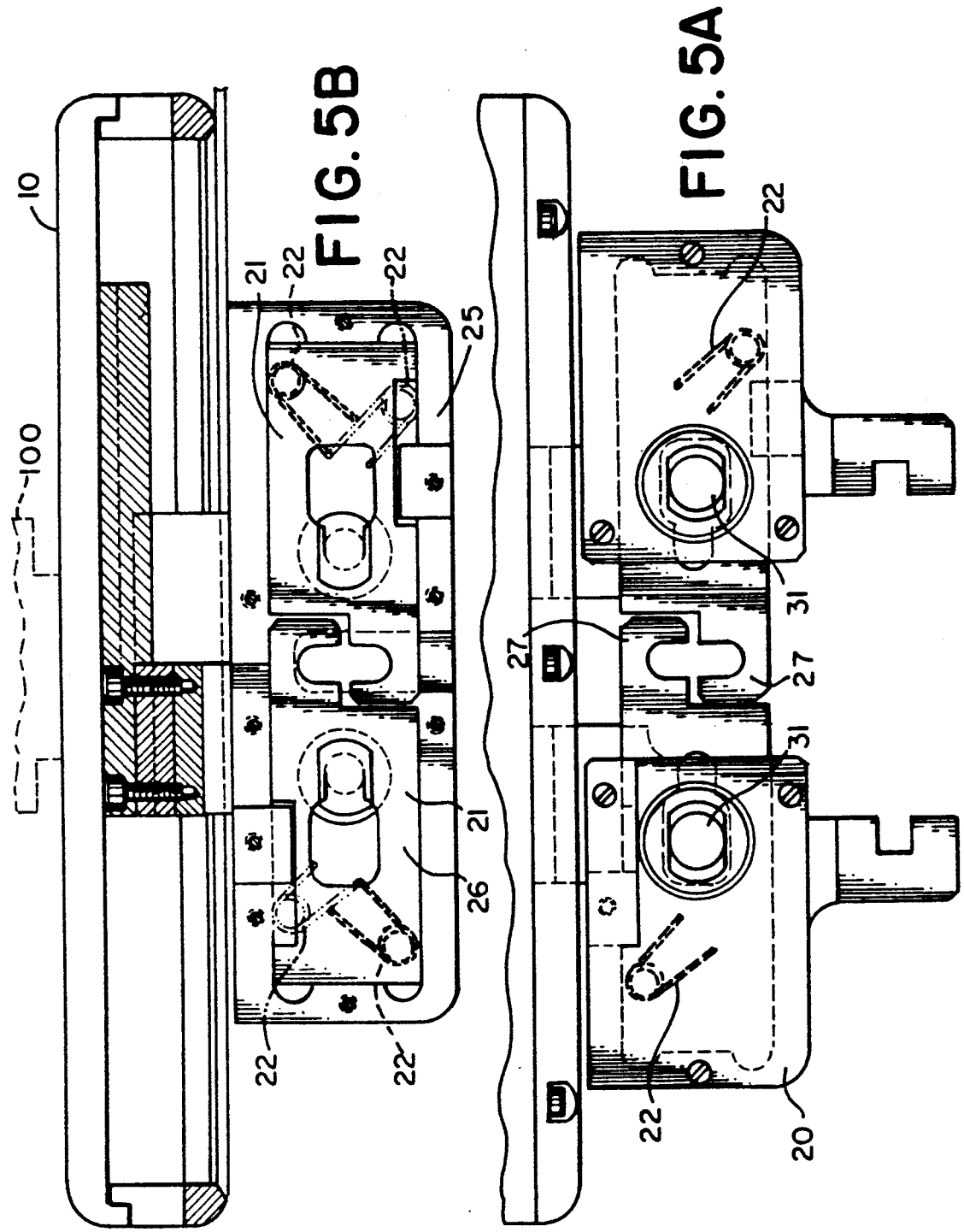

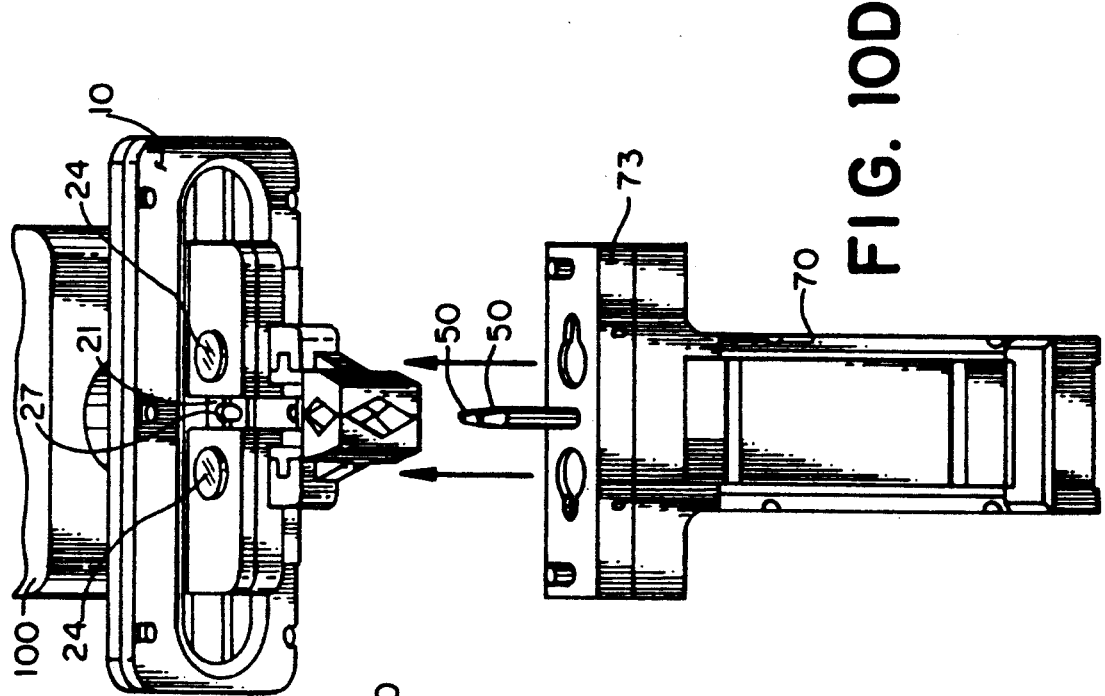
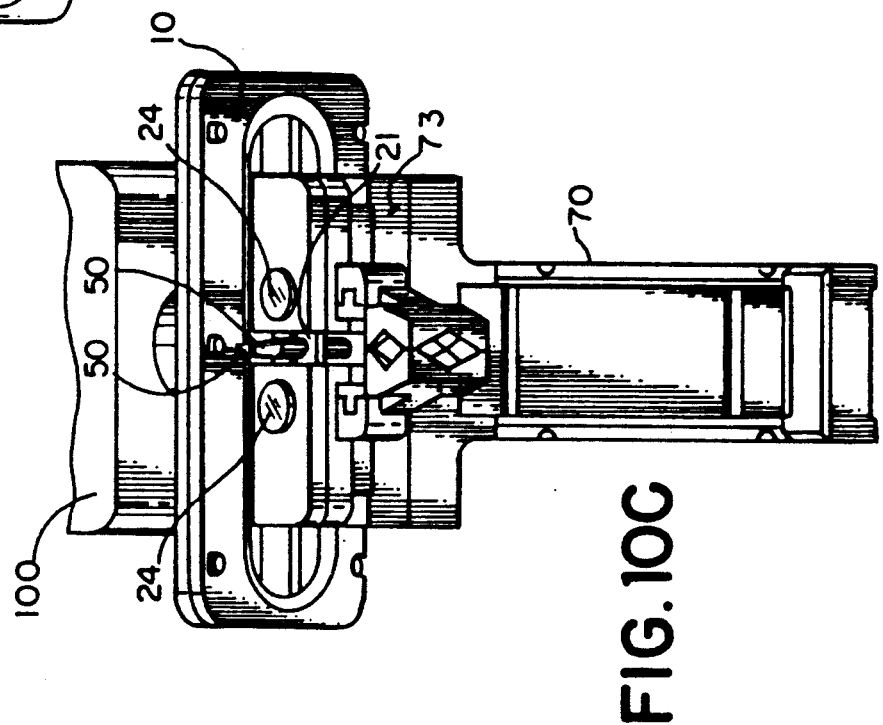

GRIPPER EXCHANGE MECHANISM FOR SMALL ROBOTS

This is a continuation of application Ser. No. 466,523, filed Jan. 17, 1990 abandoned.

The present invention relates to methods and apparatus for exchanging the end effectors of small robots. More specifically, the present invention relates to apparatus comprising a gripper exchange assembly which positively locks detachable grippers in place in conjunction with a compliant depository for exchanging grippers.

BACKGROUND OF THE INVENTION

In a chemical laboratory or similar environment it is frequently desirable to use a robot or other material handling apparatus for sample preparation and transport between instruments. Using such apparatus permits manipulation while caustic or other hazardous reactions are taking place, and also permits the handling of otherwise dangerous chemicals and their containers at extremes of temperature or other hazardous conditions. It is important that the robot or other material handling apparatus used in these applications is capable of gripping various shaped vessels containing the samples. Among the most common of these vessels are glass test tubes; however, numerous others such as small flasks, beakers, vials, bottles with screw caps or crimp caps, and plastic trays which contain many individual sample wells, the latter known as microtiter plates, are also commonly handled. Moreover, many laboratory procedures are repetitive and require the handling of several different vessels in a sequence; therefore, the laboratory robot or other material handling apparatus must be able to readily change its "end effectors" (i.e., "grippers" or "fingers") during the execution of such a sequence.

Numerous end-effector exchange mechanisms have been proposed by others. For example, U.S. Pat. No. 4,549,846—Torri et al. discloses a hand exchanger for industrial robots, which has a changer unit mounted fixedly on the industrial robot and a changer adapter holding a robot hand which is detachably fitted into the changer unit. The changer unit has hydraulic piston end clamping balls urged toward a clamping position by a piston. The changer adapter is fitted in the changer unit and clamped by the agency of the clamping piston. Another exemplary device is described in U.S. Pat. No. 4,621,854—Boley et al. This patent discloses a device for changing tools in an industrial robot and consists of a linear drive mechanism which drives a hook-shaped structure to initially carry out a curved motion, essentially perpendicular to the linear closing or opening motion of the hand. These devices can be classed among those that contain active elements such as electromagnets or hydraulic actuators to attach the end effector to the rest of the apparatus.

A second class of end-effector exchange mechanisms involves those without active elements which employ the robot's own motion capability to pick up, engage, unengage and deposit the tools. One example of such a device is disclosed in U.S. Pat. No. 4,660,274—Goumas et al. This patent discloses a robot tool changing apparatus which effects the transfer and connection of tools between a tool holder and a robot hand. A pin on the tool holder and a pin on the hand are received during tool transfer within a bore extending through the tool shank. One of the pins enters the bore from one end thereof and the other pin enters from the other end of the bore.

A "passive" gripper exchange mechanism is also disclosed by U.S. Pat. No. 4,715,636—Wiesner et al. This device provides a circular coupling opening and a locking member opening of rectangular cross-section disposed transversely across the circular coupling opening. The gripper or finger to be exchanged is provided with a coupling plug having a lateral, circumferential recess in the form of an annular groove. When the device is in the "locked" state, a locking member engages both the locking member opening and the lateral recess of the coupling plug. The locking and unlocking of the gripper from the robotic arm is accomplished by sliding surfaces which the locking member is moved and urged against by the gripper actuation mechanism. The Wiesner et al. reference uses a rigid deposit fixture plate to restrain the grippers during the engagement or release of the locking member and coupling plug.

The apparatus disclosed by Wiesner et al. still suffers from certain limitations, however, particularly in reference to its use in laboratory robots having relatively small operating forces and otherwise relatively delicate construction. The apparatus disclosed requires the coupling plug to be axially spring loaded to resist the lateral movement of the locking member. This movement is caused by the locking member being forced over a wedge surface during locking and release movements. The coupling plug must necessarily be provided with sufficient clearance with respect to the coupling member to prevent it from jamming. The reference therefore provides resilient catches and locking members to accommodate the clearance once locking is achieved. Moreover, the clearance required by the spring loaded coupling plug of Wiesner, et al. prevents it from serving as an accurate positioning device for the gripper/arm interface. Thus, the referenced device requires two sets of conical plugs, cylindrical pins, cone-shaped receptacles and a synthetic resin fill-up to achieve registration in the locking sequence.

Therefore, the apparatus disclosed presents a device requiring a relatively large force to operate and overcome the various spring loaded members and other forces in its interfaces, while also having an inherently inaccurate registration between the coupling plug and coupling opening which must be "taken up" by other means. These attributes do not lend themselves well to reliable and accurate tool exchange using the relatively small forces provided by laboratory robots and similar materials handling apparatus used in high precision applications.

SUMMARY OF THE INVENTION

Therefore it is an object of the present invention to provide methods and apparatus by which the grippers or end effectors used on a robot or similar device may be exchanged. As set forth above, it would be desireable to provide a gripper exchange mechanism which uses the robot's own motion to actuate the exchange apparatus and that such actuation required as small a force as possible. Accordingly, it is a further object of the present invention to provide apparatus which "locks" or "unlocks" an end effector without requiring a substantial force to overcome the locking mechanism. Finally, it would be desireable to permit grippers to be exchanged without requiring precise placement of the robotic arm upon the grippers. Thus, another object of the present invention is to provide a compliant tool depository upon which a pair of grippers may be disposed to facilitate exchange.

The present invention presents methods for releasably attaching an end effector to apparatus for handling objects, such as small laboratory robots. In a preferred embodiment an end effector disposed on a tool depository is provided. The tool depository preferably has guide pins and means for engaging a portion of the end effector. Also provided is a tool holder for engaging the end effector and guide pins, which is attached to the apparatus for handling objects. The tool holder is first substantially aligned with the guide pins, then the apparatus for handling objects is moved to cause the tool holder to engage the guide pins and the end effector. The tool holder itself is then preferably manipulatedtto engage the end effector. Finally, the tool holder is withdrawn from the guide pins and the end effector is thus releasably attached to the apparatus for handling objects. The methods of the present invention preferably substantially align the tool holder with the guide pins by manipulating the apparatus for handling objects. The step of manipulating the tool holder means itself to engage the end effector preferably involves actuating the tool holder using the motive force provided by the motion of the end effector.

In a preferred embodiment disclosed, a linear rack and pinion drive which actuates a pair of grippers and manipulates the tool holder to engage the end effector, which preferably entails driving the grippers toward each other is provided. In this embodiment, the end effector preferably comprises a locking plug and the tool holder is manipulated to engage the end effector by sliding a latch plate means into engagement with the locking plug on the end effector.

The present invention also discloses methods for detaching an end effector from apparatus for handling objects which substantially comprises the reverse of the sequence just described.

The present invention also provides apparatus for releasably attaching an end effector to apparatus for handling objects, comprising a tool depository for retaining an end effector, the tool depository means has guide pin means and means for engaging a portion of the end effector. In a preferred embodiment, the tool holder is engageable with the guide pins and is capable of being manipulated to engage the end effector. The tool depository is preferably affixed to a surface at a location and the apparatus for handling objects, such as a programmable robotic arm, can be manipulated to extend to the location where the tool depository is affixed.

In a preferred embodiment, the tool depository comprises a base and a top surface upon which the guide pins are disposed and the means for engaging a portion of the end effector is an opening formed on the top surface. The opening preferably is keyhole-shaped. A restraining spring for releasably retaining an object within the second portion is also provided. A useful aspect of the present invention is the provision of a resilient connection between the base and the top surface of the tool depository. As described herein, the resilient connection is made from four plates, arranged so as to form a double nested parallelogram structure. Each plate comprises a substantially rigid section and at least two flexible sections.

The apparatus of the present invention also comprises a tool holder for engaging the end effector and the guide pins. The tool holder itself is attached to the apparatus for handling objects. The tool holder preferably is of the type having at least two portions attached to a drive, whereby the portions are selectively moved together or apart. In a preferred embodiment, the drive comprises a rack and pinion. A tool holder made in accordance with the present invention also preferably comprises a latch plate which has an opening which is keyhole-shaped, and is adapted for engaging and disengaging the end effector. A pair of such latch plates preferably each further comprise a latch spring affixed to a latch plate. A preferred embodiment thus provides a bi-stable latch plate which has a first locking position and a second unlocked position at which the latch plate is mechanically stable.

Further preferred embodiments of tool depository apparatus for storing and exchanging grippers for use in apparatus for handling objects, and apparatus for exchanging end effectors attached to robotic manipulators are also disclosed by the present invention, as set forth in detail below.

BRIEF DESCRIPTION OF THE DRAWING

FIG. 2 is a bottom view of a preferred embodiment of a gripper and tool holder made in accordance with the present invention.

FIG. 3 is a cross-sectional view, taken along line 3—3 of FIG. 2.

FIG. 4 is a cross-sectional view, taken along lines 4—4 of FIG. 3.

FIGS. 5A–5B is an exploded top view of the gripper and tool holder of FIG. 2.

FIGS. 10A–10D are a sequence of perspective views which illustrate a gripper exchange performed using the methods and apparatus of the present invention.

DETAILED DESCRIPTION

Figure 1:
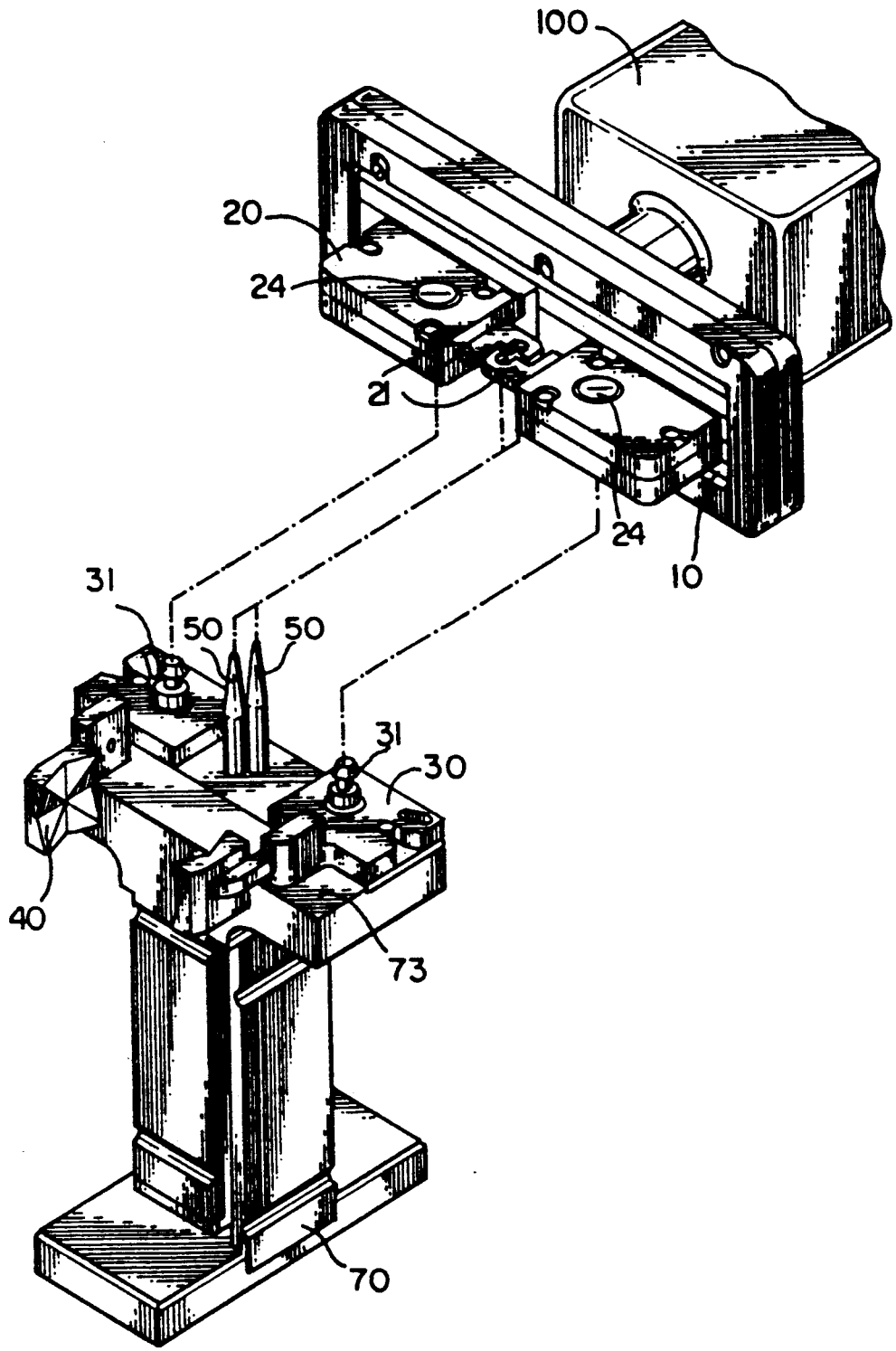
FIG. 1 is a perspective view of a set of two grippers resting on a tool depository made in accordance with the present invention, as well as a robot arm and its associated tool holder.

Referring to FIG. 1, there is shown a perspective view of a preferred embodiment of the apparatus of the present invention. A double parallelogram compliant tool depository 70 upon which a pair of grippers 40 is disposed is provided. In the context of the present invention, the terms "gripper," "finger," and "end effector" are interchangeable and all refer to the apparatus provided which is to be attached to the robot or other manipulator for purposes such as manipulating objects or for performing other tasks, such as capping or uncapping bottles. Thus, although the specific terms such as "finger" and "gripper" are used extensively throughout the specification, the devices which can be exchanged with the present invention are not limited to the class of end effectors which grasp objects.

The gripper 40 illustrated is a two-piece version adapted for handling test tubes, however, it will be understood that numerous other types of grippers and jaws may be substituted for those illustrated. The gripper 40 and its associated standardized exchange plate 30 are disposed on a keyhole plate 73. As will be explained below, the keyhole plate 73 restrains the gripper components 30,40 during the exchange sequence. Affixed to the robot arm or other manipulator 100 is a tool holder 20 and pinch rack 10, which operate in conjunction with the tool depository 70 to effect gripper exchanges. In order to exchange grippers, a plurality of tool depositories 70 having different grippers 40 disposed thereon will be positioned within the reach envelope of the distal end of the apparatus for manipulating objects to which 10 the tool holder is attached, typically a robot arm 100.

As shown by the dashed lines in FIG. 1, in a preferred embodiment, a pair of guide pins 50 are affixed to the surface of the keyhole plate 73 which forms the upper surface of the tool depository 70. In other embodiments, the pair of guide pins 50 could be replaced by a single tapered component which engages a portion of the tool holder 20. As the robot arm is brought near the tool depository 70, the tapered portion of the guide pins 50 will engage the latch plates 21 which form a part of the tool holder 20. The tapered guide pins 50 assure the accurate engagement of the tool holder 20 and the standardized exchange plate 30 to permit exchange to occur without requiring precise placement of the toolholder 20 by the robot arm 100.

Another aspect of the present invention which makes the methods and apparatus disclosed relatively insensitive to inaccuracies in the placement of the tool holder 20 upon the tool depository 70 and the gripper 40 disposed thereon is the provision of mechanical compliance. This mechanical compliance is most preferably accomplished by- the use of a novel double nested parallelogram linkage, described below. Therefore, although each of the plurality of tool depositories 70 provided should be in a known location to permit access by recall of the location by the robot controller the present invention presents the advantage that the location of the tool depository 70 does not have to be fixed in place with a high degree of precision.

Referring again to FIG. 1, it can be observed that as the latch plates 21 are engaged and lowered on the tapered guide pins 50, the working plugs 31 disposed on the standardized exchange plates 30 are in registered alignment with and engage the tool holder 20, as will be explained in greater detail below. The full insertion of the working plugs 31 into the tool holder 20 permits the actuation of the tool holder 20 to engage or disengage the grippers 40 and associated standardized exchange plate 30 from the tool holder 20 and the tool depository 70.

FIG. 2 is a bottom view of the tool holder 20 and gripper assembly 30,40, illustrating the pinch rack 10 with the tool holders 20, left and right, and the gripper assembly comprising a standardized exchange plate 30 and the specialized gripper 40. The robotic arm 100 or other manipulator or material handling apparatus to which the present invention is attached is shown in phantom. The pinch rack 10 preferably contains the drive which actuates the toolholder 20, moving the two sections together and apart as necessary. This function results in a clamping motion or other actuation of the jaws of the gripper 40, as well as providing the relative motion necessary to exchange grippers. As explained above, the jaws of the gripper 40 illustrated are designed to permit the handling of test tubes, however, numerous other jaw designs can be substituted. Most preferably, a rack and pinion drive is used.

Referring now to FIG. 3, a cross-sectional view, taken along line 3—3 in FIG. 2 is shown. In FIG. 3 the details of the gripper exchange mechanism and the tool holders 20 can be seen. The interior of the tool holder housing contains the bi-stable latch plate 21, the latch spring 22, and cover plate 23 with peephole window 24. The working plug 31, which protrudes from the standardized exchange plate 30 is shown inserted in the tool holder 20. The storage plug 32 is seen to extend from the bottom of the exchange plate 30. Each working plug 31 has a substantially annular groove or "neck" which permits the standardized exchange plate 30 to be restrained by sliding into a slot in either the tool holder 20 or tool depository 70.

FIG. 4 depicts a cross-sectional view of one of the tool holders 20 taken through a plane perpendicular to the cross-section of FIG. 3, as shown by line 4—4. The tool holder 20 containing the bi-stable latch 21 and cover plate 23 with peephole window 24 are all visible. Inserted and locked in the tool holder 20 is the standardized exchange plate 30, carrying the working plug 31 and the storage plug 321 as well as a specialized gripper 40 for grasping cylindrical objects. Inside the pinch rack housing 10 can be seen the two bilateral racks 11. These are driven by an axially arranged pinion shaft which is not visible in this view. As will be understood by those of ordinary skill, numerous other drive mechanisms can replace the bilateral rack 11 shown. For example, spur gear trains, belts and pulleys or hydraulic or electromechanical actuators could provide similar motion. In the view shown in FIG. 4, the locking engagement is between the bi-stable latch 21 and the working plug 31, which is affixed to the standardized exchange plate 30 and the gripper 40 is shown.

An exploded top view of the pinch rack assembly 10 and tool holder 20, with the tool holder cover plate 23 removed to afford a detailed view of the bi-stable latches 21, the keyhole 26 in the bi-stable latches 21, and the hook 27 formed at the end of the latch 21 are shown in FIGS. 5A-5B. Also seen is the latch spring 22 in its two end positions (shown in phantom) with the latch locked, and with the latch open. The stop plate 25 provides for an accurate stop of the bi-stable latches 21 when it is open. FIG. 5A shows the bi-stable latches 21 closed through the temporary engagement with the taper pins 50 (not shown) located on the tool depository 70. In FIG. 5B, the working plugs 31 have entered the wide part of the keyholes 26 in the bi-stable latches 21 and the latch spring 22 is in the "open latch" position, being held there by the stop plate 25. The specialized grippers 40 have been omitted in this view. FIG. 5A shows the two alternate positions of the latch springs 22, the "open latch" position being shown in phantom. Thus the apparatus of the present invention, in a preferred embodiment, includes a pair of bi-stable latches 21 which are attached to latch springs 22 or toggle links which permit the latch plate to be "bi-stable." For purposes of the present invention, bi-stable is defined as the two states of a device having a first locking position and a second unlocked position, these being the only positions at which a device such as the bi-stable latches shown are mechanically stable which means that the bi-stable latch plates 21 can provide a stable resisting force during attachment or detachment.

Figure 6:
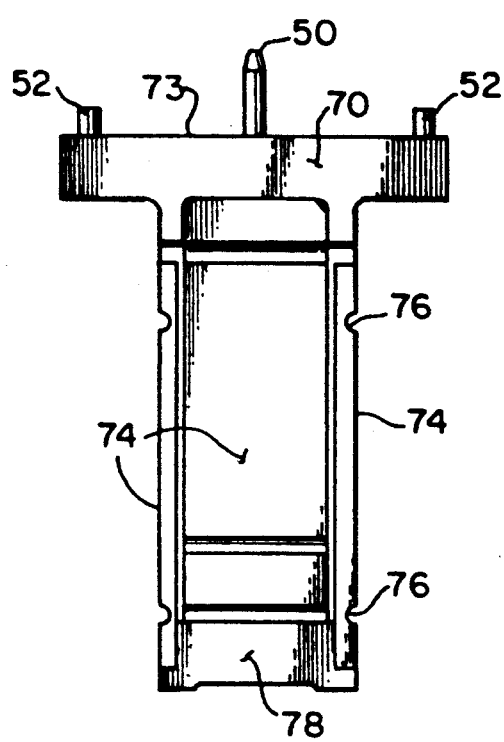
FIG. 6 is a front view of a novel double parallelogram tool depository constructed in accordance with the present invention.
Figure 7:
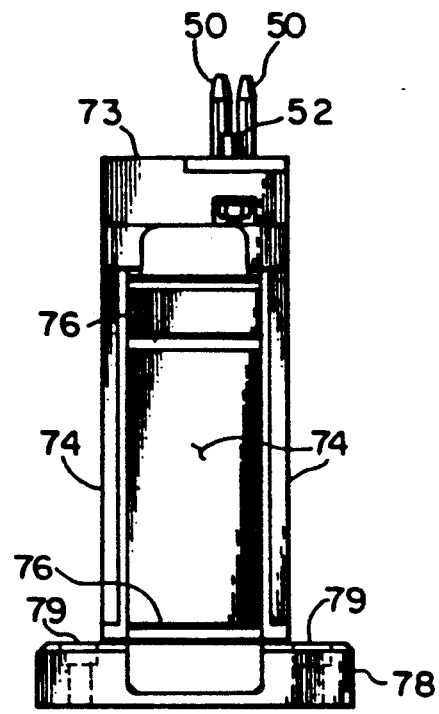
FIG. 7 is a side view of the tool depository of FIG. 6.

FIG. 6 shows a more detailed view of the tool depository 70, on which the fingers, grippers or other end effectors 40 are stored when not in use. Most preferably several tool depositories 70 are provided on a laboratory bench or similar surface, each holding a different set of tools or grippers 40. As shown in FIG. 1 a typical set of two grippers 40 (left and right) may be stored in an oriented attitude on the tool depository 70 shown in FIG. 6. A further side elevation view of the depository 70 of FIG. 6 is illustrated in FIG. 7. Referring to FIGS. 6-7, it can be seen that the tool depository 70 is preferably comprised of four side panels 74, each having hinge means 76, created, for example, by the depressions shown. By forming the side panels 74 of a resilient, flexible material and nesting the side panels as shown, a double parallelogram is formed, which, in conjunction with a rigid top and bottom portion permits lateral motion of the tool depository 70 during gripper exchange. Thus, a structure is provided by the present invention which is substantially insensitive to the approach errors or "docking errors" of the robotic arm or other manipulator 100. This compliance may also be provided by other means, for example, the side plates 74 may be comprised of a rigid material and the hinge means 76 may be another, more resilient material or a leaf spring may be used to form the side plates 74.

The base 78 of the tool depository is preferably affixed to a surface. As shown, screws 79 can be used to allow the tool depository 70 to be positioned at any of several locations on a surface. Since the base 78 is affixed to a surface, the tool depository 70 will substantially exhibit the characteristics of a cantilevered leaf spring in the directions perpendicular to the facial surfaces of the side panels 74, while the top surface remains parallel to the surface to which it is affixed.

The elements which maintain the grippers 40 and standardized exchange plate 30 in a fixed position relative to the surface upon which they reside are also shown in FIGS. 6-7. As explained above, two tapered guide pins 50 are preferably provided which help achieve registration between the tool holder 20, the tool depository 70, and the grippers 40 to be exchanged. Two fixturing pins 52 are also provided which engage portions of the standardized exchange plate 30 to maintain it in a fixed configuration after the tool holder 20 has been withdrawn. Each gripper 40 is preferably restrained in the plane of the upper surface formed by the keyhole plate 73 of the tool depository 70 by at least two points, a fixturing pin 52 and the engagement of the storage plug 32, shown, for example, in FIG. 4. The gripper 40 or each portion thereof is thus prevented from moving or rotating relative to this plane.

Figure 8:
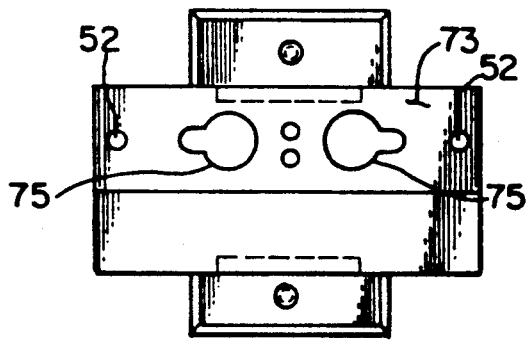
FIG. 8 is a top view of the keyhole surface of the tool depository shown in FIGS. 6–7.

Referring now to FIG. 8, a top view of the tool depository 70 depicted in FIGS. 6-7 is shown. In addition to the above-described tapered guide pins 50 and fixturing pins 52, the keyhole-shaped apertures 75 provided to aid in the exchange and lock the gripper are visible. The keyhole-shaped apertures 75 are designed to accept the storage plug 32 protruding from the bottom surface of the standardized exchange plate 30. Thus, the larger diameter of the circular portion of the keyhole shaped aperture 75 must be slightly larger than the diameter of the "head" formed at the distal end of the storage plug 32. The narrow slot-like portion of the keyhole shaped aperture 75 should be smaller than the diameter of the head of the storage plug 32 but of slightly greater width than the diameter of the "neck" of the storage plug 32 which connects the head of the storage plug 32 to the standardized exchange plate 30.

Figure 9:
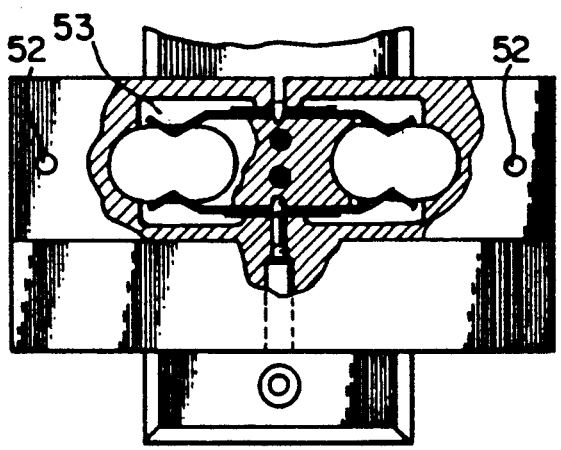
FIG. 9 is a partially broken away view of the keyhole surface depicted in FIG. 8.

In FIG. 9, a portion of the top surface 73 of the tool depository 70 has been broken away in order to reveal the configuration of the leaf springs 53. These leaf springs 53 help retain the grippers 40 in place and centered in the narrow slot-like part of the keyhole-shaped slots 75. Observation of the configuration of the leaf springs 53 reveals that they will act to restrain the storage plug 32 when it has been moved to its farthest outward position relative to the centerline of the tool depository 70. As the storage plug 32 moves from the center outward, it will pass over and deflect the portion of the spring extending into the slot. Thus, when the storage plug 32 is in its farthest outward location, it will be restrained by the leaf spring 53 when the force provided by the pinch rack 10 is removed.

Figure 10B:
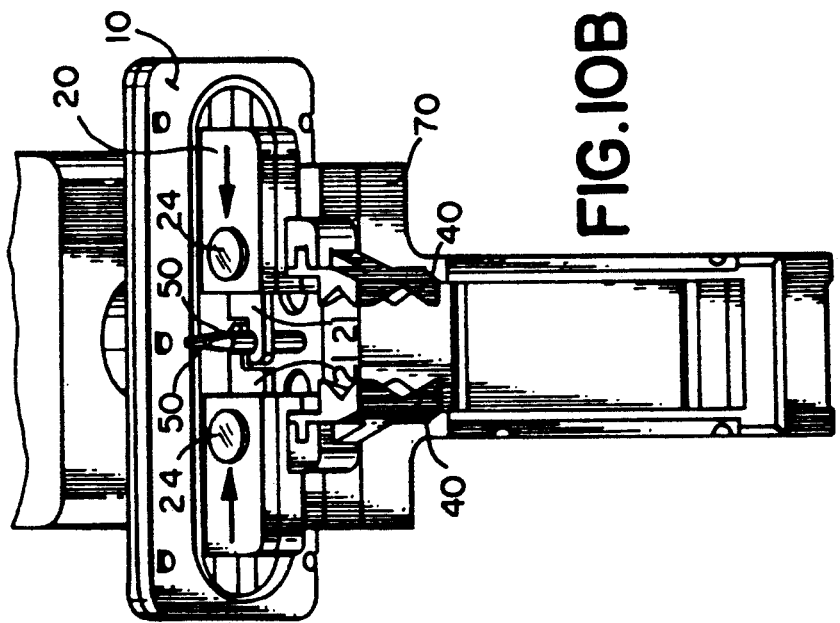
Figure 10A:
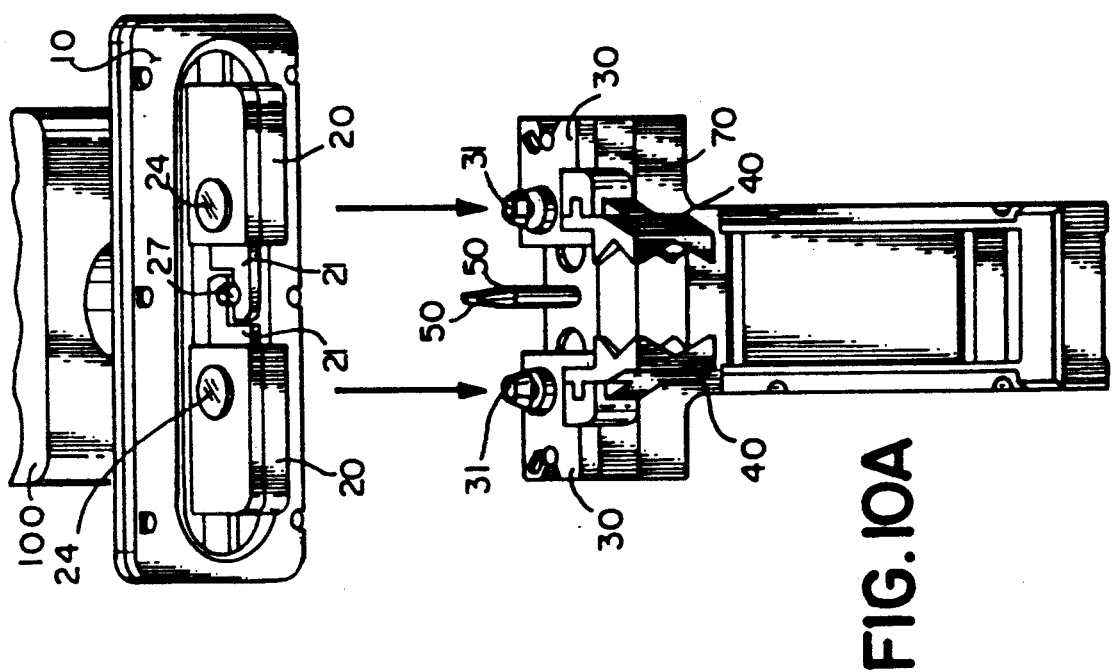

FIGS. 10A-10D show the principal steps during a gripper exchange sequence. It will be understood by those of ordinary skill that the methods of depositing grippers 40 the tool depository 70 is the exact opposite of the sequence illustrated. Referring now to FIG. 10A, it is shown that when the manipulator 100 extends toward the tool depository 70 and hovers over the stored grippers 40, it is positioned such that the extended bi-stable latches 21 are approximately vertically above the taper pins 50 on the tool depository 70. When the pinch rack 10 is then lowered towards the tool depository 70, the working plugs 31 protruding from the standardized exchange plate 30 attached to the grippers 40 enter the tool holder 20 from below, until the tool holders 20 "bottom out" on top of the exchange plates 30, resulting in the configuration shown in FIG. 10B. In this position, the neck on the working plug 31 is at the level of the relatively thin latch plate 21, as explained above with reference to FIG. 3. As shown in FIG. 10A, at this point in the pick up sequence, the bi-stable latches 21 are in an extended, i.e., "latch open" state. In the latch-open state, the wide part of the keyhole-shaped apertures 26 (not visible) in the bi-stable latches 21 are centered with a hole in the bottom of the tool holders 20 shown by the location of the cover 24. As described above, this condition permits the working plugs 31 protruding from the tops of the standardized exchange plates 30 to enter the tool holders 20, pass through the latch plates' key-hole shaped apertures 26, as shown in FIG. 4, and come to rest when the movement "bottoms out" after bringing the tool holders 20 together by operation of the pinch rack 10, as explained immediately below. The apparatus for handling objects 100 may now transfer the stored grippers 40 from their resting place to the work place, firmly attached thereto.

In order to pick up the grippers with relatively little effort, the pinch racks 11, as shown in FIGS. 2-5, are activated to move the tool holders 20 towards each other. This motion is illustrated by FIGS. 10B-10C. When this "pinch" motion is complete, as shown in FIG. 10C the following has happened:

1. The standardized exchange plates 30 have slid towards each other on the top surface 73 of the tool depository 70 and the storage plugs 32 (not visible) are now centered on the circular portion of the keyhole shaped apertures 75 (visible in FIG. 10D) in the tool depository 70.

2. The latch plates 21 have been pushed into the body of tool holder 20 as a result of their protruding hooks 27, being engaged with the taper pins 50. This motion is supported during the second half of the motion by the bi-stable latch spring 22 flipping into the other of two possible stable states, as shown in FIG. 5.

3. In the process, the narrow portion of the keyhole-shaped aperture 26, as shown in FIG. 4, has engaged the groove of the corresponding working plugs 31, preventing the grippers 40 from dropping out of the tool holders 20 when the robot arm 100 is lifted.

This completes the "lock-up" phase of the gripper exchange routine. Since the storage plugs 32 are no longer restricted by the keyhole aperture 75 formed on the surface 73 of the gripper depository 70 as mentioned above, all that is needed to take the grippers away is a lifting of the hand 100, which is shown by the arrows in FIG. 10D.

It should be noted that the bi-stable latches securing the working grippers 40 stay safely locked during any conceivable movement or operation. As illustrated in FIG. 10B, the "latched" state coincides with the condition of "maximum pinch", i.e., grippers 40 appear as touching each other. However, an entirely different set of tools would not alter this condition, since a central internal stop plate 25, not shown, built into the pinch rack lo provides this limit, and not the tools touching, as explained above in reference to FIG. 5.

Compared with the other known gripper or end-effector exchange techniques referred to above, the scheme of the present invention offers several advantages. The forces needed to switch the state of the bi-stable latch 21 are minimal, which makes the scheme of the present invention attractive for small laboratory robots. Tools are held in place securely by a "key-lock" action, as opposed to friction locks or spring retention used in certain prior art references. This feature minimizes a source of trouble—the loss of grippers by dropping off while the apparatus is in operation or during the exchange itself. Also, the double nested parallelogram design incorporated into the tool depository 70 of the present invention permits the relative motion of the components. The mechanical compliance of the tool depository 70 contributes to this improvement, together with the "lead-ins" provided by the tapered guide pins 50. Other parts, such as sizing of the working plugs 31 and storage plugs 32 also contribute to the improvement.

Although certain embodiments of the present invention have been described with particularity, one of ordinary skill will perceive numerous variations and modifications which lie within the spirit of the invention disclosed. Accordingly, reference should be made to the appended claims in order to ascertain the scope of the present invention.

What is claimed is:

1. A method for releasably attaching an end effector to an apparatus for handling objects, comprising the steps of:
   (a) provided a tool depository comprising at least two guide pins extending from a surface connected to the tool depository that includes a keyhole plate for engaging a portion of said end effector;
   (b) providing a tool holder connected to the apparatus for handling objects comprising: a pair of bi-stable latches for engaging said guide pins and said end effector by activating a pinch rack connected to the latches for moving the latches between a closed position and an opened position;
   (c) aligning said pair of latches substantially with said guide pins by manipulating said apparatus for handling objects;
   (d) manipulating said apparatus for handling objects to engage said pair of latches with said guide pins;
   (e) engaging the latches with said end effector by actuating said pinch rack to move the latches to a closed position, thereby disengaging the end effector from the keyhole plate; and
   (f) withdrawing said tool holder means from said guide pins, whereby said end effector is releasably attached to said apparatus for handling objects.

2. The method of claim 1 wherein said pinch rack is comprised of a linear rack and pinion drive and comprising the step of manipulating said latch plates means to engage said end effector by driving said pinch rack closed.

3. The method of claim 2, wherein said end effector comprises a working plug and said tool holder is manipulated to engage said end effector by sliding a latch plate means into engagement with said working plug on said end effector.

4. Apparatus for releasably attaching an end effector to an apparatus for handling objects, comprising:
   (a) a tool depository comprising a plate having an aperture for retaining a storage plug,; and at least two guide pin means disposed upon the plate;
   (b) a tool holder comprising a pair of bi-stable latches for engaging said guide pin means and the end effector, said tool holder means attached to aid apparatus for handling objects; and
   (c) pinch rack means connected to the latches for selectively manipulating the latches between an open position and a closed position.

5. The apparatus of claim 4, wherein said tool depository is affixed to a surface at a location.

6. The apparatus of claim 4, wherein said apparatus for handling objects comprises a robotic arm.

7. The apparatus of claim 4 wherein said aperture has a first substantially circular portion connected to a second slot-like portion having a width less than the diameter of said first portion.

8. The apparatus of claim 7 further comprising restraining means for releasably retaining an object within said second portion.

9. The apparatus of claim 7 further comprising resilient means connecting said base and said top surface.

10. The apparatus of claim 9, wherein said resilient means comprises at least four plates, arranged so as to form a double nested parallelogram structure.

11. The apparatus of claim 4 wherein said tool holder comprises at least two portions attached to a drive means, whereby said portions are selectively moved together or apart by said drive means and wherein each of said portions comprises a latch plate means for engaging and disengaging said end effector.

12. The apparatus of claim 11 wherein said latch plate comprises an opening adapted for engaging and disengaging said end effector.

13. The apparatus of claim 12 wherein said latch plate means is attached to spring means whereby said latch plate is a bi-stable latch and has a first locking position and a second unlocked position at which said latch plate is mechanically stable.

14. Apparatus for storing and exchanging an end effector for use in an apparatus for handling objects, wherein the end effector has a storage plug, comprising:
   (a) a base mounted to a base surface;
   (b) a tool depository comprising a top surface upon which said end effector is disposed at least during exchange, the top surface comprising an aperture for engaging the storage plug;
   (c) at least two guide pin means disposed upon said top surface of said tool depository; and (d) resilient side panel means connecting said base and said tool depository, whereby the resilient side panel means permits the tool depository to move relative to the base while the top surface remains substantially parallel to the base surface.

15. The apparatus of claim 14 wherein said aperture has a first substantially circular portion and a second slot-like portion having a width less than the diameter of said first portion.

16. The apparatus of claim 14 further comprising restraining means for releasably retaining an object within said second portion.

17. The apparatus of claim 14 wherein said resilient side panel means comprises at least four plates, each of said plates comprised of a substantially rigid section and at least two flexible sections.

18. The apparatus of claim 17 wherein said plates are so as to form a double nested parallelogram structure.

19. Apparatus for exchanging end effectors attached to robotic manipulators comprising:

(a) a depository comprised of:
   a base portion and a top surface upon which an end effector may be placed;
   at least two fixturing pins which restrain said end effector attached to said top surface;
   at least two symmetrically disposed openings in the top surface, the openings having two sections, one of relatively larger opening size to permit entry of a portion of said end-effector and a second section for engaging said end-effector;
   one or more tapered guide pins disposed along an axis between said openings and extending from the plane of said top surface; and
   resilient means disposed between and connecting said base portion and said top surface;

(b) tool holder means for engaging an end effector, comprising: (1) at least two symmetrically disposed hook means, said hook means attached to said tool holder by latch springs, and the geometry of said hook means chosen to approximate the spatial arrangement of said guide pins, (2) drive means for manipulating said hook means, wherein the tool holder thereby comprises bi-stable latch for engaging a portion of said end effector; and (c) an end effector comprising at least two portions for engaging said tool holder and at least two portions of engaging said storage depository, whereby said tool holder is engaged with said end effector and the drive means is manipulated to disengage said end effector from said depository, and said end effector thereby becomes latched to said tool holder means.

20. The apparatus of claim 19, wherein said portions for engaging said tool holder and for engaging said storage depository comprise substantially cylindrical plug means having an annular groove formed thereon.

* * * * *